April 19, 1960  H. H. STAIR  2,933,691
MODULATOR
Filed Dec. 17, 1957  2 Sheets-Sheet 1

INVENTOR.
HENRY H. STAIR
BY
Christie, Parker & Hale
ATTORNEYS

April 19, 1960

H. H. STAIR 2,933,691

MODULATOR

Filed Dec. 17, 1957

INVENTOR.
HENRY H. STAIR

BY Christie, Parker & Hale

ATTORNEYS

United States Patent Office 2,933,691
Patented Apr. 19, 1960

2,933,691

MODULATOR

Henry H. Stair, Monrovia, Calif., assignor to Bell & Howell Company, Chicago, Ill., a corporation of Illinois Application December 17, 1957, Serial No. 703,349

2 Claims. (Cl. 179—171)

This invention relates to a device for measuring small amplitude signal levels of low frequency and more particularly to a modulator circuit which provides high common mode rejection and low common mode conversion.

It is often desirable to measure small changes of low frequency electrical signals from bridge networks and transducers employed to indicate various parameters such as pressure, temperature and the like. The rate at which such signals change in amplitude is so low that for all practical purposes they may be considered D.C. signals. If such low amplitude signals are applied directly to an amplifier having one or more stages, the signals may be sufficiently amplified to operate an indicator device. Because amplifying devices are made up of current-carrying electrical components, they tend to heat up and thereby change their operating characteristics. In addition, the electrical characteristics of electrical components change with age. These and other factors cause the output of an amplifier to vary within certain limits when a constant signal level is applied to the input. This variation in the output of an amplifier with a constant input is referred to as drift. Where D.C. levels on the order of several microvolts are applied to the input of an amplifier, drift of the amplifier alone may cause the output to vary in amplitude by an amount which may exceed the several microvolt input. For this reason it is often desirable to avoid connecting a source of low frequency, low amplitude signals directly to an amplifier.

It is customary, therefore, in many instances to supply low level D.C. signals to a network which includes a series arrangement of a modulator device, an amplifier with one or more stages of amplification and a demodulator. In the process the D.C. signals of low amplitude applied to the input of the modulator are converted to A.C. signals. These A.C. signals are next amplified and then demodulated to provide an output signal which is an amplified replica of the low level D.C. signals applied to the input of the modulator. The drift problem in the amplifier is minimized because variations in the output of the amplifier resulting from drift are more in the nature of D.C. signals, and only A.C. signals from the amplifier are coupled to the demodulator.

Where a small difference between two D.C. signals is to be measured, the difference amplitude being on the order of several microvolts, a slight unbalance in the impedance of lead wires interconnecting the bridge or transducer to a modulator causes an error to exist in the difference signal. In addition to this error, noise signals may be induced in the lead wires or other part of the input circuit. If a noise signal induced in one lead wire of the input circuit is not the same in amplitude as the noise signal induced in the other lead wire of the input circuit, an unbalance results. Restated in the alternative, any undesired or error signals present in both lines of a differential input present a net error equal to their difference. Accordingly, the net difference of the undesired signals gives rise to an error signal usually so small it may be disregarded.

It is sometimes desirable to measure a small difference between two electrical signals where each of the electrical signals may be relatively large in amplitude when compared to the difference. The difference between the two signals may be designated a normal mode signal while any signal level common to both signals under investigation may be termed a common mode signal. The output signal of an ideal measuring device would reflect only an amplified version of the normal mode signal at the input. In practice, however, components of the common mode signal at the input are reflected at the output. To the extent that common mode signals are reflected in the output, an error results. Hence it is a feature of the present invention to minimize at the output the effect of common mode signals applied to the input of a difference measuring device.

According to one preferred embodiment of the present invention, a modulator is provided which includes a pair of resistors coupled between a source of low frequency, low amplitude signals and a first pair of terminals. A second pair of terminals are provided with a high resistance connected therebetween. A condenser is connected to a pair of movable blades which are driven back and forth between the first and second pairs of terminals. Both switches are driven in synchronism by any suitable source such as a relay type coil energized by an A.C. signal, usually referred to as a carrier signal. Because the switch blades are driven at a carrier frequency the low amplitude, low frequency signals applied to the first pair of terminals are converted to pulses at the second pair of terminals having a repetition rate determined by the carrier frequency and an amplitude determined by the amplitude of the low frequency signals. The switch blades are preferably of a type which break contact completely with the first pair of terminals before making contact with the second pair of terminals. This insures complete isolation of the input circuit coupled to the first pair of terminals and the output circuit coupled to the second pair of terminals. Accordingly, the transfer of common mode signals from the first pair of terminals to the second pair of terminals is reduced and common mode conversion is minimized. The output of the modulator presents an A.C. signal which is coupled to an amplifier including one or more stages. After suitable amplification the A.C. signal is applied to a phase splitting network which provides both a positive and a negative replica of the A.C. signal to a demodulator network which in turn converts these signals back to a D.C. signal. This signal is preferably filtered to eliminate carrier frequency signal components and thereby provide an output signal which is an amplified replica of the low amplitude D.C. signals under investigation.

As the switch blades travel for a short instant of time between the first pair of terminals and the second pair of terminals stray capacities from the condenser, its leads and the blades to ground are charged up by components of the common mode signal from the bridge network. The common mode signal supplied by the stray capacities to the input of the amplifier represents an error component. The ratio of the normal mode output signal from the filter network over the common mode signal applied to the second pair of terminals times the amplification factor of the amplifier may be defined as the common mode conversion. The amount of common mode signal supplied to the second pair of terminals and appearing at the output of a filter network as though it were part of the normal mode or differential signal represents an error which should be minimized.

It is a feature of this invention to minimize common mode conversion by grounding one of the second terminals and arranging the switch arms so that the one associated with the grounded terminal closes before the switch arm associated with the other terminal closes. This permits the stray capacities from the condenser, its leads and the switch arms to ground to discharge through the grounded terminal before the high voltage end of the condenser is connected to the other terminal of the second pair of terminals. Thus the transfer of common mode signals from the first pair of terminals to the second pair of terminals is decreased, and the effects of common mode conversion are minimized.

These and other features of this invention may be more fully appreciated when considered in the light of the following specification and drawings in which.

Figure 1:
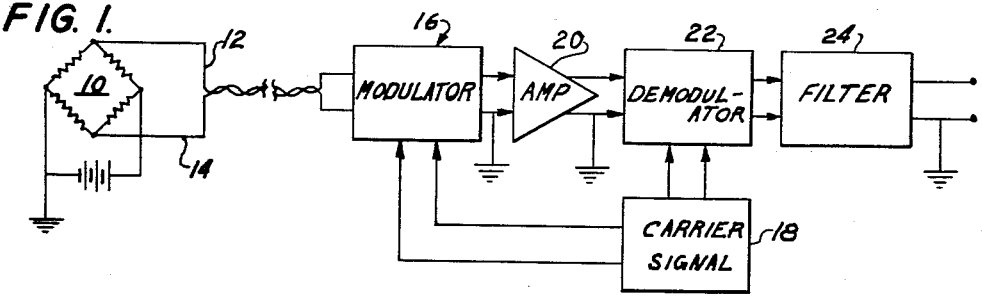
Fig. 1 illustrates the system aspects of the present invention.

Referring first to Fig. 1, a system illustrating the present invention is shown partly in block form and partly in electrical diagram form. A bridge network 10 supplies a signal through conductors 12 and 14, which may be a very long line on the order of several hundred feet or more to the input of a modulator 16. Here the low level D.C. signal is converted into pulses having a pulse repetition rate determined by a source of carrier signals 18. The amplitude of the pulses is determined by the small difference in amplitude of the D.C. signals on the lines 12 and 14. The output of the modulator 16 is supplied to an amplifier 20 which in turn supplies a demodulator 22. The demodulator 22 is operated at the carrier frequency and the output is substantially free of the carrier signal. A filter device 24 removes any remaining components of the carrier signal and provides at its output an amplified replica of the difference of the two D.C. signals applied to the input of the modulator 16.

Figure 2:
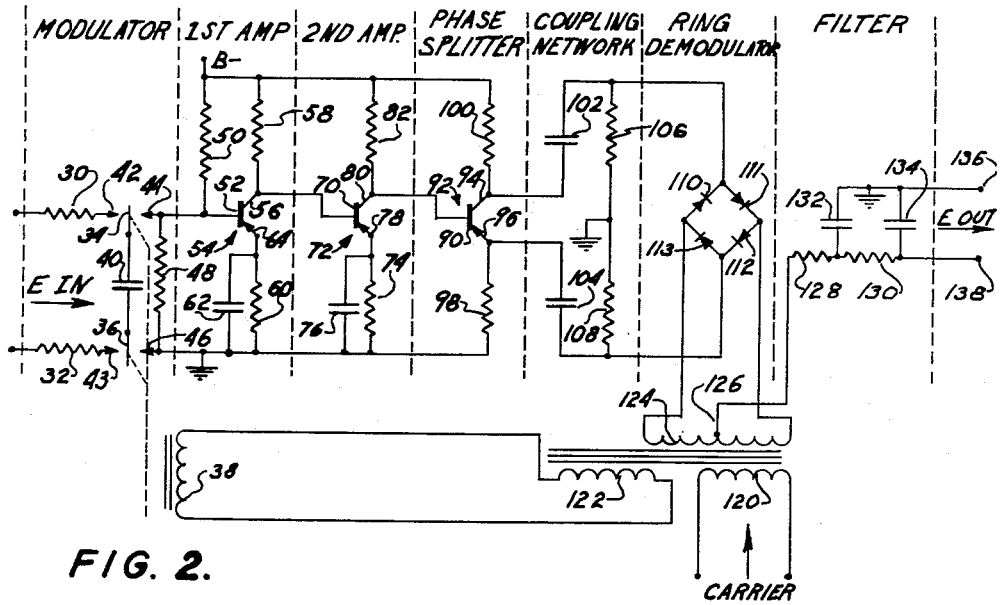
Fig. 2 illustrates in greater detail a system according to the present invention.

Reference is made to Fig. 2 for a detailed description of one specific circuit arrangement according to the present invention which may be employed for the devices shown in block form in Fig. 1. A pair of input signals from the bridge 10 in Fig. 1 are applied to resistors 30 and 32 of the modulator in Fig. 2. A chopper having a pair of switch arms 34 and 36 is operated by a carrier signal applied to a transformer secondary winding 38. A condenser 40 is connected between the two chopper arms 34 and 36. When the switch arms 34 and 36 engage a first pair of contacts 42 and 43 respectively the condenser 40 is charged to a voltage determined by the difference in voltage of the two input signals. When the carrier signal reverses polarity the switch arms 34 and 36 engage a second pair of contacts 44 and 46 respectively. The voltage previously established on the condenser 40 is then applied across a resistor 48. The charging time constant of the resistors 30, 32 and the condenser 40 is sufficiently short that the condenser 40 charges up to the difference between the two voltages applied to the resistors 30 and 32 when the switch blades 34, 36 engage terminals 42, 43. The discharge time constant of the condenser 40 and the resistor 48 is large with respect to the time that the switch blades 34, 36 engage terminals 44, 46. This insures that the condenser 40 is not discharged very much into the resistor 48, and the waveform of the voltage across the condenser 40 is preserved. The switch arm 36 makes contact with the terminal 46 a short interval of time before the switch arm 34 makes contact with the terminal 44. This serves to discharge inherent capacities between the switch arms 34, the condenser 40 and the switch arm 36 and ground. Since such inherent capacities include components of common mode signals, common mode conversion is minimized. Thus the demodulator serves to provide a single-ended output in response to a differential input, the output signal having substantially on common mode signal components.

The output of the modulator is applied to the first amplifier. The resistor 48 and a resistor 50 are connected in series between ground and a negative source of potential designated B—. The contact 46 is grounded and the contact 44 is connected to the base electrode 52 of the transistor 54. Therefore it is seen that the signal established on the resistor 48 from the condenser 40 is applied as an input to the base electrode 52 of the transistor 54. A collector electrode 56 is connected through a bias resistor 58 to the negative source of potential. An emitter bias network including a resistor 60 and a condenser 62 is connected between an emitter 64 and ground. Any D.C. signals applied to the base electrode undergo very low amplification because the resistance of the resistor 60 is high. On the other hand the A.C. impedance of the condenser 62 is low, thereby providing high A.C. gain. Accordingly the output signal from the collector 56 represents a large amplification of the A.C. signals applied to the base electrode 52, and the components of D.C. signal applied to the base electrode 52 undergo very little gain, providing very little D.C. signal output at the collector 56.

The output of the first amplifier is coupled to a second amplifier. The output signal from the collector 56 of the first amplier is supplied to the base electrode 70 of transistor 72 in the second amplifier. Here again the emitter bias network including a resistor 74 and a condenser 76 are connected between an emitter electrode 78 and ground. A.C. signals on the collector electrode 80 are greatly amplified whereas D.C. signals are almost nonexistent. This is because the resistor 74 presents a high impedance to D.C. signals and the condenser 76 provides a low impedance to A.C. signals. The collector 80 is coupled through a bias resistor 82 to the negative source of potential.

The output of the second amplifier is coupled to a phase splitter. Output signals taken from the collector 80 in the second amplifier are coupled to the base electrode 90 of the transistor 92 in the phase splitter. Since D.C. signals have been substantially eliminated the signal waves appearing on collector electrode 94 and an emitter electrode 96 are amplified A.C. signals having opposite polarities. The emitter electrode 96 is connected to ground through a resistor 98 and the collector electrode is coupled to the negative source of potential through a resistor 100. The signals of opposite polarity taken from the collector 94 and the emitter 96 are coupled through respective condensers 102 and 104 to corresponding resistors 106 and 108. This resistor-condenser arrangement serves as a coupling network to convey the output signals from the phase splitter to the ring demodulator. The ring demodulator includes diodes 110 through 113.

A carrier signal is applied through a primary winding 120 to secondary windings 122 and 124. The secondary winding 122 supplies the carrier signal to the drive winding 38 of the chopper previously described. The secondary winding 124 supplies the carrier signal to the ring demodulator. As shown the carrier is applied to the ring demodulator at the junction points of diodes 110, 113 and 111, 112. A center tap 126 of a transformer 124 is coupled to a filter network including resistors 128, 130 and condensers 132, 134 connected as shown. An output signal is taken from the terminals 136 and 138.

Figure 3:
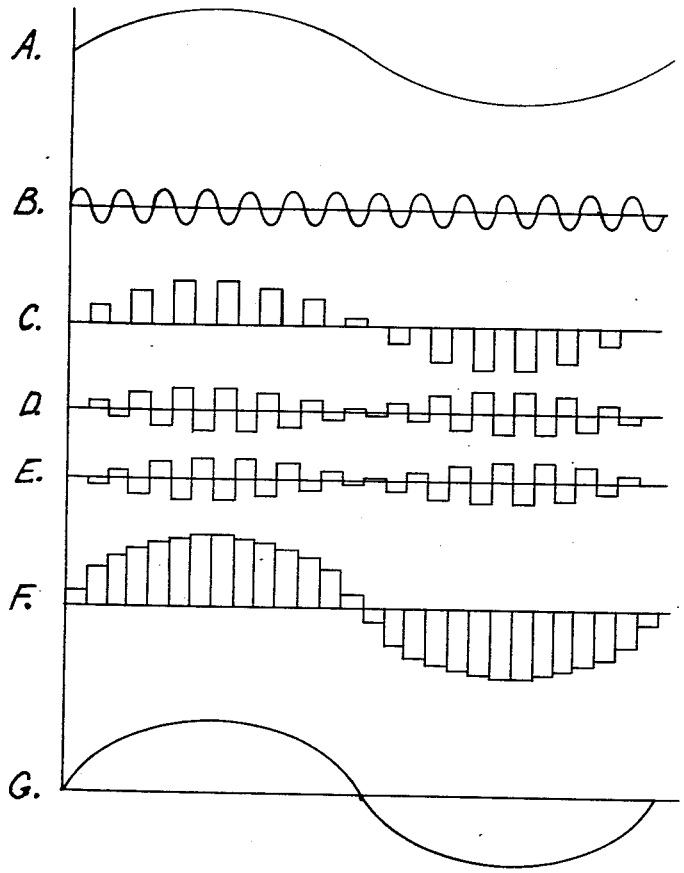
Fig. 3 illustrates various waveforms at different points throughout the circuit in Fig. 2.

In order to show how the two signals applied to the input of the device in Fig. 2 are treated at various points throughout the circuit, reference is made to Fig. 3. The curve A in Fig. 3 represents the difference between two D.C. signal levels taken from the bridge 10 in Fig. 1. The difference signal is assumed to vary as a sine wave, and although the differential signal is on the order of several microvolts, it is exaggerated in curve A for purposes of illustration. The carrier signal applied to the transformer primary winding 120 in Fig. 2 is represented by the wave B in Fig. 3. The switch arms 34 and 36 in Fig. 2 may be connected to the terminals 42, 43 on positive cycles of the wave B in Fig. 3 and to the terminals 44 and 46 on negative cycles of the wave B in Fig. 3. The pulses supplied to the first amplifier in Fig. 2 on the negative cycles of the carrier wave B in Fig. 3 are illustrated by the pulses shown in Fig. 3C. The output signal from the collector 56 of the first amplifier in Fig. 2 is indicated in Fig. 3D. The output signal at the collector 80 of the second amplifier in Fig. 2 is indicated in Fig. 3E. It is recalled that the first and second amplifiers suppress D.C. signals and pass A.C. signals. The output signal at the collector 94 of the phase splitter in Fig. 2 is an amplified version of the wave indicated in Fig. 3D. The output signal at the emitter electrode 96 of the phase splitter in Fig. 2 is an amplified version of the wave indicated in Fig. 3E. The amplified version of the waves indicated at Figs. 3D and 3E are coupled through respective condensers 102 and 104 to the ring demodulator in Fig. 2. On positive cycles of the carrier signal the diodes 112 and 113 conduct and pass the positive portions of the pulses from the emitter electrode 96 of the phase splitter in Fig. 2 to the filter circuit. On negative cycles of the carrier wave the diodes 110 and 111 conduct and pass the positive portions of the wave from the collector electrode 94 of the phase splitter in Fig. 2 to the filter. It is readily seen by comparing the waves of Figs. 3D and 3E that if the positive portions of the pulses indicated are combined, an amplified wave substantially as indicated in Fig. 3F results. The signal supplied to the filter network in Fig. 2 is substantially as indicated in Fig. 3F. The output of the filter network in Fig. 2 is substantially as indicated in Fig. 3G. This signal is an amplified replica of the input signal indicated in Fig. 3A.

Figure 4:
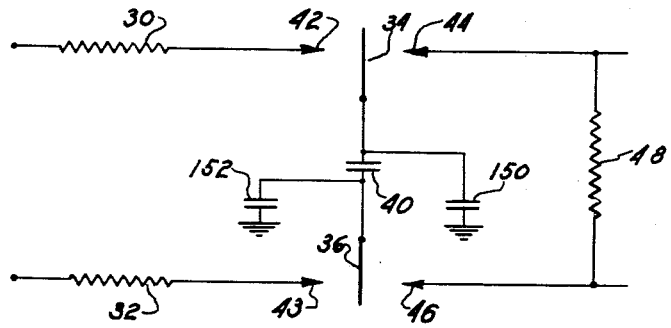
Fig. 4 illustrates a modification of the modulator in Fig. 2.

Referring now to Fig. 4, a modification of the modulator in Fig. 2 is shown. The parts of the modulator in Fig. 4 are labeled with the same numbers as corresponding parts in Fig. 2. The circuit in Fig. 4 includes an added pair of condensers 150 and 152 connected between opposite terminals of the condenser 150 is connected in parallel with an inherent capacity that exists between the condenser 40, the switch arm 34 and ground. Also the condenser 152 is connected in parallel with an inherent capacity that exists between the condenser 40, the switch arm 36 and ground. The condensers 150 and 152 are much smaller than the condenser 40, but they are much larger than the inherent capacities in parallel therewith. The condensers 150 and 152 serve to minimize the transfer of common mode signals normally transferred through the inherent capacities to the terminals 44 and 46, and the condensers are balanced for minimum conversion. In other words, the condensers 150 and 152 serve to more completely isolate the terminals 42, 43 from the terminals 44, 46. In operation, the switch arm 36 makes contact with the terminal 46 slightly before the switch arm 34 makes contact with the terminal 44. During this brief interval that the switch arm 36 engages the terminal 44 before the switch arm 34 engages the terminal 44, signals on the condensers 150 and 152 are discharged to ground. It is readily seen that the condenser 152 is grounded on both terminals by this operation. The condenser 150 is also effectively grounded by this operation because the capacitive reactance of the condenser 40 is very low for the signal being dissipated to ground. The signals on the condensers 150 and 152 are discharged in a short interval of time. It is to this signal of short duration from the condenser 150 that the condenser 40 provides a low impedance. Accordingly it is seen that the condensers 150 and 152 serve to reduce the effect of inherent capacities in parallel therewith, thereby minimizing common mode conversion.

What is claimed is:

1. A chopper circuit for modulating a low level D.C. input signal from a floating source, comprising chopper means including a pair of switch arms, a pair of contacts associated with each switch arm, and means for simultaneously moving each of the switch arms between the pair of associated contacts at a modulating rate, a pair of input terminals across which the input signal is applied, first and second resistors respectively connecting the input terminals to contacts associated with the two switch arms, a third resistor connected between the remaining contacts associated with the two switch arms, one end of the third resistor and associated contact being grounded, and a condenser connected between the two switch arms, the contact connected to the grounded end of the third resistor being arranged to engage the associated switch arm before the contact connected to the other end of the third resistor engages the other switch arm, whereby the condenser is connected to the grounded end of the third resistor before it is connected to the ungrounded end of the third resistor.

2. The apparatus of claim 1 wherein a second condenser is connected between one terminal of said condenser and ground and a third condenser is connected between the opposite terminal of said condenser and ground.

References Cited in the file of this patent
UNITED STATES PATENTS

| 2,752,491 | Ringoen | June 26, 1956 |

FOREIGN PATENTS

| 536,292 | Great Britain | May 9, 1941 |
| 527,042 | Canada | June 26, 1956 |

UNITED STATES PATENT OFFICE

CERTIFICATE OF CORRECTION

Patent No. 2,933,691                                April 19, 1960

Henry H. Stair

It is hereby certified that error appears in the printed specification of the above numbered patent requiring correction and that the said Letters Patent should read as corrected below.

Column 2, line 57, after "terminals" insert a comma; column 4, line 2, for "on" read -- no --.

Signed and sealed this 4th day of October 1960.

(SEAL)
Attest:

KARL H. AXLINE                                    ROBERT C. WATSON
Attesting Officer                                 Commissioner of Patents